US010912106B2

(12) United States Patent
Huang et al.

(10) Patent No.: US 10,912,106 B2
(45) Date of Patent: Feb. 2, 2021

(54) DISTRIBUTED SCHEDULING METHOD FOR FRONTHAUL-BASED C-RAN WIRELESS NETWORK ARCHITECTURE

(71) Applicant: Apple Inc., Cupertino, CA (US)

(72) Inventors: Min Huang, Beijing (CN); Xu Sunny Zhang, Beijing (CN); Senjie Zhang, Beijing (CN); Shanshan Zheng, Beijing (CN); Hui Guo, Beijing (CN)

(73) Assignee: Apple Inc., Cupertino, CA (US)

( * ) Notice: Subject to any disclaimer, the term of this patent is extended or adjusted under 35 U.S.C. 154(b) by 24 days.

(21) Appl. No.: 15/777,430

(22) PCT Filed: Dec. 23, 2015

(86) PCT No.: PCT/CN2015/098461
§ 371 (c)(1),
(2) Date: May 18, 2018

(87) PCT Pub. No.: WO2017/107106
PCT Pub. Date: Jun. 29, 2017

(65) Prior Publication Data
US 2018/0359770 A1    Dec. 13, 2018

(51) Int. Cl.
*H04W 72/12* (2009.01)
*H04W 88/08* (2009.01)
*H04L 1/18* (2006.01)

(52) U.S. Cl.
CPC ....... *H04W 72/1231* (2013.01); *H04W 72/12* (2013.01); *H04W 72/1268* (2013.01);
(Continued)

(58) Field of Classification Search
None
See application file for complete search history.

(56) References Cited

U.S. PATENT DOCUMENTS

2014/0003819 A1    1/2014 Cho et al.
2014/0031049 A1 *  1/2014 Sundaresan .......... H04W 16/02
                                                        455/447
(Continued)

FOREIGN PATENT DOCUMENTS

WO    2014076004 A2    5/2014

OTHER PUBLICATIONS

International Preliminary Report on Patentability dated Jul. 5, 2018 for International Application PCT/CN2015/098461.
(Continued)

*Primary Examiner* — Peter Chen
*Assistant Examiner* — Jeff Banthrongsack
(74) *Attorney, Agent, or Firm* — Eschweiler & Potashnik, LLC

(57) ABSTRACT

An apparatus for use in a radio aggregation unit (RAU) of a cloud radio access network (Cloud-RAN or C-RAN), the cloud-RAN including a radio cloud center (RCC) and a plurality of radio remote systems (RRS) coupled to the RCC, wherein each RRS comprises an RAU coupled to a plurality of Remote Radio Units (RRUs) is disclosed. The apparatus comprises an input circuit configured to receive a first scheduling result from the RCC and a scheduling circuit configured to generate a second scheduling result for scheduling the one or more UEs in the coverage area of the RAU. Further, the apparatus comprises a processing circuit configured to selectively schedule a select UE from one or more UEs in the coverage area of the RAU, based on the first scheduling result from the RCC or the second scheduling result or an integration of the first scheduling result and the second scheduling result, based on a predetermined threshold associated with a receipt time of the first scheduling result from the RCC at the RAU.

19 Claims, 8 Drawing Sheets

(52) U.S. Cl.
CPC ..... *H04W 72/1273* (2013.01); *H04W 88/085* (2013.01); *H04L 1/1812* (2013.01)

(56) References Cited

U.S. PATENT DOCUMENTS

2014/0148181 A1* 5/2014 Lee ............... H04W 72/085 455/452.1
2016/0226628 A1* 8/2016 Stephenne ............ H04L 1/1816

OTHER PUBLICATIONS

Extended European Search Report dated May 31, 2019 for European Patent Application 15911105.3.
"White Paper of Next Generation Fronthaul Interface." China Mobile Research Institute et al. Version 1.0. Oct. 4, 2015, 40 pages.
I, Chih-Lin et al. "NGFI, The xHaul." 2015 IEEE Globecom Workshops (GC WKSHPS), Dec. 6, 2015. 5 pages.
I, Chih-Li et al. "Rethink Fronthaul for Soft RAN," Software Defined 5G Networks for Anything As A Service, IEEE Communications Magazine. Sep. 2015. 7 pages.
"Motivation far Study on Cloud RAN Architecture." KT Corporation. 3GPP TSG RAN meeting #70, Sitges, Spain, Dec. 7-10, 2015 RP-151884.5 pages.
International Search Report dated Oct. 9, 2016 for International Application PCT/CN2015/098461.
"4G LTE Advanced CoMP, coordinated multipoint is used to send and receive data to and from a UE from several points to ensure the optimum performance is acheved even at cell edges." 3G LTE ComP Tutorial, Coordinated Multipoint, Radio-Electronics.com. 11 pages.
Balasubramanian, Dushyanth. "QoS In Ceullar Networks." May 9, 2006. 24 pages.
Lavallee, Brian, "What is mobile fronthaul?" Ciena Insights Blog (http://www.ciena.com/connect/blog). Jul. 9, 2015. pages. 4 pages.
"LTE in a Nutshell: The Physical Layer." White Paper, 2010 Telesystem Innovations Inc, 18 pages.
"HARQ in LTE" LTE in Wireless, 3 pages.
"LTE Resource Allocation in Time-Frequency Plane." RAYmaps, Oct. 28, 2011. 5 pages.
"Media access control." Wikipedia, 3 pages.
"OSI model." Wikipedia, 9 pages.

* cited by examiner

DISTRIBUTED SCHEDULING METHOD FOR FRONTHAUL-BASED C-RAN WIRELESS NETWORK ARCHITECTURE

This application is a National Phase entry application of International Patent Application No. PCT/CN2015/098461 filed Dec. 23, 2015, entitled "DISTRIBUTED SCHEDULING METHOD FOR FRONTHAUL-BASED C-RAN WIRELESS NETWORK ARCHITECTURE" in the name of Min Huang et al. and is hereby incorporated by reference in its entirety.

FIELD

The present disclosure relates to a cloud radio access network (Cloud-RAN or C-RAN) and, in particular to a method and apparatus for distributed scheduling in a fronthaul-based C-RAN wireless network architecture.

BACKGROUND

Cloud-RAN is recognized as an important feature for next generation of radio access network (RAN) due to its capability to reduce the overall computation resource and power consumption and to support advanced inter-cell coordination functions such as CoMP. A typical network architecture for C-RAN comprises a radio cloud center (RCC) and a plurality of radio remote systems (RRS). Each RRS is further composed of a radio aggregation unit (RAU) coupled to a plurality of remote radio units (RRU). Therein, RCC and RAU are the baseband signal and protocol processing unit, taking the role of traditional base band unit (BBU), and the RCC and the RAU are connected to each other by a so called "fronthaul interface (FI)" network.

To make the FI network low-cost and flexible, the FI network in C-RAN is shared by all RRSs in a statistical multiplexing manner, and in some embodiments, it is based on Ethernet, called a next generation fronthaul interface (NGFI). In the architecture of FI-based C-RAN, in some embodiments, RAN function is split between RCC and RRS. For example, in one of the modes of operation, the media access control (MAC) function is performed in RCC and the physical layer (PHY) function is performed in RAU. In this mode, the PHY-MAC interface messages are transferred between RAU and RCC via NGFI. However, in such architecture, the packets transferred in the NGFI network encounter possibly large latency and jitter, which affects the network throughput.

BRIEF DESCRIPTION OF THE DRAWINGS

Some examples of circuits, apparatuses and/or methods will be described in the following by way of example only. In this context, reference will be made to the accompanying Figures.

DETAILED DESCRIPTION

Figure 1:
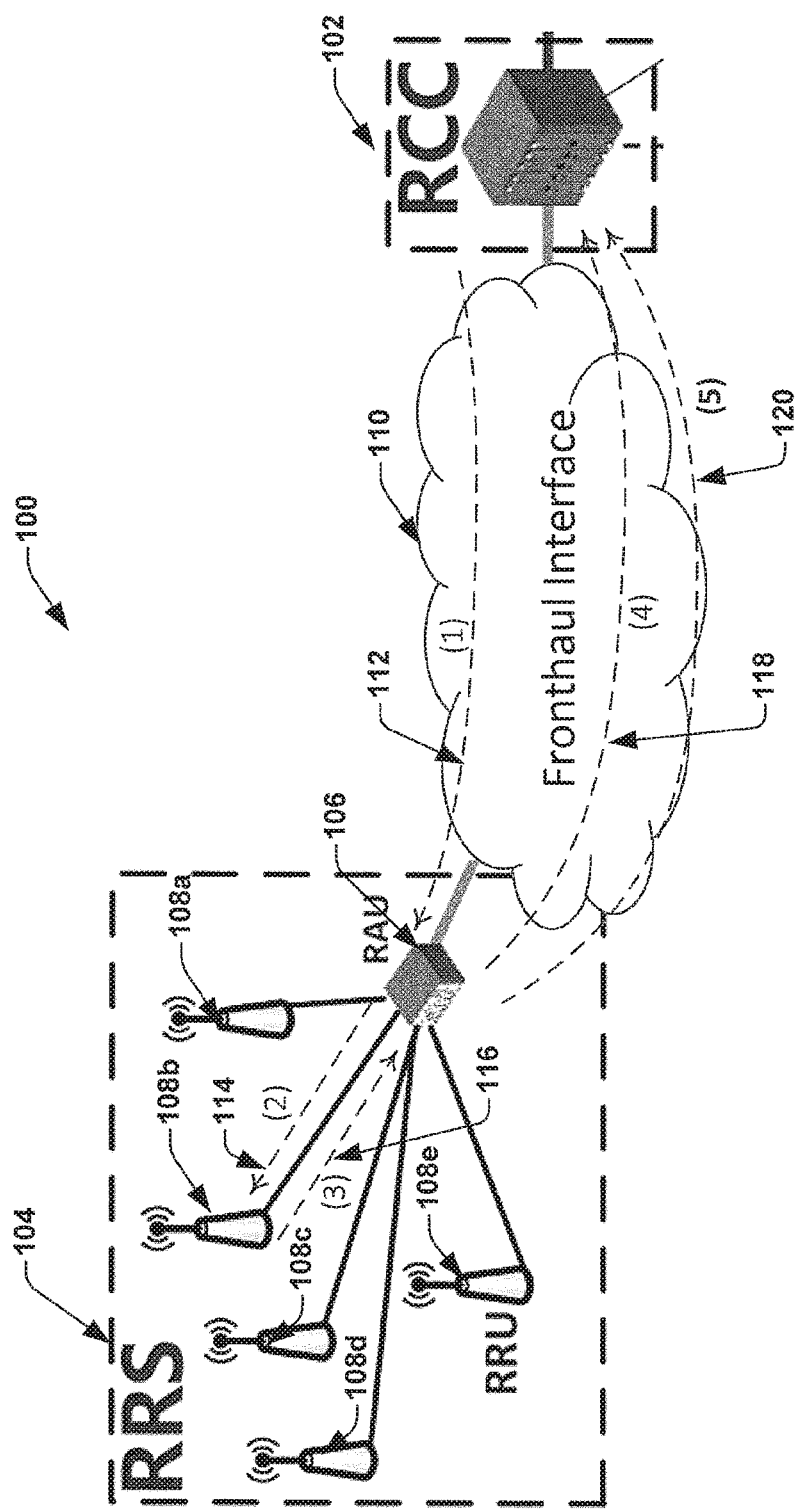
FIG. 1 shows a block diagram that depicts message transfer in a fronthaul interface (FI) based C-RAN, according to one embodiment of the disclosure.

In one embodiment of the disclosure, an apparatus for use in a radio aggregation unit (RAU) of a cloud radio access network (Cloud-RAN) is disclosed. The cloud-RAN comprises a radio cloud center (RCC) and a plurality of radio remote systems (RRS) coupled to the RCC, wherein each RRS comprises an RAU coupled to a plurality of remote radio units (RRUs). The apparatus for use in the RAU comprises an input circuit configured to receive a first scheduling result from the RCC, wherein the first scheduling result is configured to schedule one or more user equipments (UEs) in a coverage area of the RAU. The apparatus further comprises a scheduling circuit configured to generate a second scheduling result for scheduling the one or more UEs in the coverage area of the RAU. Further, the apparatus comprises a processing circuit operably coupled to the input circuit and the scheduling circuit and configured to selectively schedule a select UE from the one or more UEs in the coverage area of the RAU, based on the first scheduling result from the RCC or an integration of the first scheduling result and the second scheduling result, to generate a selective scheduling result, when the first scheduling result from the RCC is received at the input circuit before the start of a downlink (DL) layer 1 transmission processing at the processing circuit. In some embodiments, the processing circuit is further configured to schedule the select UE from the one or more UEs in the coverage area of the RAU, based on the second scheduling result of the RAU, when the first scheduling result from the RCC is not received at the input circuit before the start of the DL layer 1 transmission processing at the processing circuit. In addition, the apparatus comprises an output circuit configured to transmit a signal associated with the downlink (DL) layer 1 transmission processing to an RRU coupled therewith; and transmit a final scheduling result from the processing circuit to the RCC, wherein the final scheduling result comprises the second scheduling result of the RAU or the selective scheduling result.

In one embodiment of the disclosure, a computer-readable storage device storing computer-executable instructions is disclosed. Such instructions, in response to execution, cause a radio aggregation unit (RAU) of a cloud radio access network (Cloud-RAN), the cloud-RAN comprising a radio cloud center (RCC) and a plurality of radio remote systems (RRS), wherein each RRS comprises an RAU coupled to a plurality of remote radio units (RRUs), to receive a first scheduling result from the RCC, wherein the first scheduling result is configured to schedule one or more user equipments (UEs) in a coverage area of the RAU. Further, the computer-readable storage device instructions cause the RAU to generate a second scheduling result for scheduling the one or more UEs in the coverage area of the RAU, receive an ACK/NACK result and a channel state information (CSI) from a select UE of the one or more UEs for DL data transfer and generate an ACK/NACK result and a channel state information (CSI) for the select UE of the one or more UEs for UL data transfer. In addition, the computer-readable storage device instructions cause the RAU to selectively schedule the select UE from the one or more UEs in the coverage area of the RAU for DL data transfer and UL data transfer, based on the first scheduling result from the RCC or an integration of the first scheduling result and the second scheduling result, to generate a selective scheduling result, by utilizing the ACK/NACK result and the CSI for the DL data transfer and the UL data transfer, respectively, when the first scheduling result from the RCC is received at the RAU before the start of a downlink (DL) layer 1 transmission processing at the RAU; and transmit the selective scheduling result to the RCC. Furthermore, the computer-readable storage device instructions, when executed, cause the RAU to selectively schedule the select UE from the one or more UEs in the coverage area of the RAU for DL data transfer and UL data transfer, based on the second scheduling result, when the first scheduling result from the RCC is not received at the RAU before the start of a downlink (DL) layer 1 transmission processing at the RAU.

In one embodiment of the disclosure, an apparatus for use in a radio cloud center (RCC) of a cloud radio access network (Cloud-RAN) is disclosed. The cloud-RAN comprises the RCC and a plurality of radio remote systems (RRS) coupled to the RCC, wherein each RRS comprises a radio aggregation unit (RAU) coupled to a plurality of remote radio units (RRUs). The apparatus for use in the RCC comprises an input circuit configured to receive a final scheduling result from a select RAU in the cloud-RAN, wherein the final scheduling result comprises a scheduling information for one or more user equipments (UEs) in a coverage area of the select RAU; and receive an ACK/NACK result and a CSI associated with the corresponding scheduled UEs from the RAU. Further, the apparatus comprises a processing circuit coupled to the input circuit and configured to generate a first scheduling result for scheduling the one or more UEs, based on the final scheduling result, the ACK/NACK result and the CSI; and a transmit circuit configured to transmit the first scheduling result to the select RAU.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising."

In the following description, a plurality of details is set forth to provide a more thorough explanation of the embodiments of the present disclosure. However, it will be apparent to one skilled in the art that embodiments of the present disclosure may be practiced without these specific details. In other instances, well-known structures and devices are shown in block diagram form rather than in detail in order to avoid obscuring embodiments of the present disclosure. In addition, features of the different embodiments described hereinafter may be combined with each other, unless specifically noted otherwise.

As indicated above, a typical network architecture for C-RAN includes a radio cloud center (RCC) and a number of radio remote systems (RRS). Each RRS is further composed of a radio aggregation unit (RAU) and a number of Remote Radio Units (RRU). In some embodiments, the RAU and RCC are connected to one another by a so called "fronthaul interface (FI)" network. In FI-based C-RAN architectures, typically, the RAN function is split between the RCC and the RAU. The advantages of this split include a reduction in flow volume in fronthaul interface networks compared to the flow volume in traditional common public radio interface (CPRI) and the possibility of utilizing a fast dynamic inter-cell coordination algorithm, like CoMP, using a central MAC controller. In typical implementations of FI-based C-RAN, a downlink (DL)/uplink (UL) scheduling process is executed at the RCC, and a UL layer 1 receive (Rx) processing and a DL layer 1 (L1) transmit (Tx) processing are executed at the RAU. In some embodiments, the DL L1 Tx processing comprises encoding the physical downlink control channel (PDCCH) and physical downlink shared channel (PDSCH), and the UL L1 Rx processing comprises decoding the physical uplink control channel (PUCCH) and physical uplink shared channel (PUSCH). In some embodiments, messages (e.g., packets) associated with the downlink (DL)/uplink (UL) scheduling at the RCC and the L1 processing at the RAU are transferred between the RCC and the RAU through the NGFI network.

However, in such architectures, the possible large latency and jitter encountered by the packets transferred in the NGFI network turns out to be a challenging problem. To meet the hybrid automatic repeat request (HARQ) round trip time (RTT) rule in the LTE standard and the future wireless network standards (e.g., 5G), the latency of message transfer in NGFI, including an interval Trx (between UL Rx L1 Process at RAU and DL/UL Scheduling Process at RCC) and an interval Ttx (between DL/UL Scheduling Process and DL Tx L1 Process at RAU), should not exceed certain thresholds. Once they exceed such a threshold, posterior processing of the HARQ process could be affected. In some embodiments, the HARQ process comprises a mechanism to correct error packets in the PHY layer. For example, if a received data has an error, then the receiver buffers the error and requests a retransmission from the sender. When the receiver receives the re-transmitted data, the receiver then combines the re-transmitted data with buffered data prior to channel decoding and error detection. In one example embodiment for DL data transfer in the FI based C-RAN, the receiver comprises a user equipment (UE) and the request for retransmission comprises sending a ACK/NACK result to the RAU, which is then processed (i.e., UL L1 Rx processing at the RAU) and sent to the RCC. In some embodiments, the time taken to transmit the ACK/NACK result from the RAU to the RCC comprises the interval Trx described above. Based on the received ACK/NACK result, the RCC chooses to selectively generate a re-transmission grant to re-transmit data to the UE. For example, if the ACK/NACK result is NACK, a scheduling result from the RCC includes a re-transmission grant for both UL data transfer and DL data transfer and if ACK/NACK result is ACK, a scheduling result from the RCC does not include a re-transmission grant for both UL data transfer and DL data transfer. In some embodiments, the time taken to transmit the scheduling result from the RCC to the RAU comprises the interval Ttx described above.

Typical examples of use cases for large latency of message transfer in FI network include (1) Ttx exceeding the restricted threshold (2) Trx exceeding the restricted threshold for DL data transfer and (3) Trx exceeding the restricted threshold for UL data transfer. In the first case, when the Ttx exceeds a predetermined restricted threshold, the DL/UL scheduling result from the RCC does not arrive at RAU before the start of the DL L1 Tx processing at the RAU. Therefore, in such embodiments, the RAU cannot encode the PDCCH/PDSCH for transmission or retransmission, thereby interrupting data transfer for a corresponding subframe. In the second case, when Trx exceeds the restricted threshold for DL data transfer, the ACK/NACK result from the UE does not reach the RCC on time before the scheduling of the next subframe at the RCC. Therefore, in such embodiments, if the scheduled DL data transfer in the first scheduling result come from a wrongly used ACK/NACK result, such scheduled DL data transfer is either redundant (for example, the ACK/NACK result is ACK but a DL retransmission is granted) or missing (for example, the ACK/NACK result is NACK but a DL retransmission is not granted), thereby affecting the cell throughput. Further, in the third case, when Trx exceeds the restricted threshold for UL data transfer, the ACK/NACK result from the RAU does not reach the RCC on time before the scheduling of the next subframe at the RCC. Therefore, in such embodiments, if the scheduled UL data transfer in the first scheduling result come from a wrongly used ACK/NACK result, such scheduled UL data transfer is either redundant (for example, the ACK/NACK result is ACK but a UL retransmission is granted) or missing (for example, the ACK/NACK result is NACK but a UL retransmission is not granted), thereby affecting the cell throughput.

This disclosure is directed towards a distributed scheduling method for FI based C-RAN wireless network architecture, in order to overcome the limitations associated with the latency of message transfer in the NGFI. In particular, an FI based C-RAN wireless network architecture with a full-scheduling function at the RCC and a limited scheduling function at the RAU is proposed. In some embodiments, the full-scheduling function at the RCC comprises, for example, scheduling for both new transmission and retransmission, scheduling for all connected UEs, scheduling with all physical resource blocks (PRBs), scheduling with all beamforming weights and scheduling for services with all QoS services. Typically, the full-scheduling function at the RCC is based on a global coordination among various cells of the C-RAN, which enables dynamic inter-cell scheduling. Therefore, in some embodiments, the full-scheduling function at the RCC enables efficient scheduling of cell-edge UEs. However, the scheduling at the RCC sometimes lack the most recent ACK/NACK result or CSI information, which affects the network throughput as explained above.

Further, in some embodiments, the limited scheduling function at the RAU comprises, for example, scheduling only for HARQ retransmission, scheduling only selected UEs from a plurality of UEs in a coverage area of the RAU, for example cell-center UEs, scheduling with a certain part of physical resource blocks (PRBs), scheduling with a part of beamforming weights and/or scheduling for time-critical services. The limited-scheduling function at the RAU is typically based on information of cells in the coverage area of the respective RAU. The RAU could not have global information about all cells of the C-RAN and therefore cannot perform joint scheduling of the cells of multiple RAUs. Therefore, in some embodiments, cell-edge UEs cannot be scheduled in an efficient manner using the limited-scheduling function at the RAU. However, in some embodiments, the limited-scheduling function at the RAU is based on the most recent ACK/NACK result and the CSI information.

In the embodiments described herein, the limitations associated with the latency of message transfer in the NGFI is overcome by utilizing a scheduling result of the RCC for the DL transmission processing at the RAU, when the scheduling result from the RCC is received at the RAU before the start of the DL transmission processing at the RAU and utilizing a scheduling result of the RAU for the DL transmission processing at the RAU, when the scheduling result from the RCC is not received at the RAU before the start of the DL transmission processing at the RAU. In some embodiments, utilizing the RCC scheduling result for DL transmission processing at the RAU comprises completely overriding the RAU scheduling result with the RCC scheduling result or integrating the RAU scheduling result with the RCC scheduling result.

FIG. 1 shows a block diagram that depicts message transfer in a fronthaul interface (FI) based C-RAN 100, according to one embodiment of the disclosure. The C-RAN 100 comprises a radio cloud center (RCC) 102 and a radio remote system (RRS) 104. In this embodiment, the C-RAN 100 comprises one RRS, that is, RRS 104, however, in other embodiments, the C-RAN 100 can have a plurality of RRSs. The RRS 104 comprises a radio aggregation unit (RAU) 106 coupled to a plurality of Remote Radio Units (RRUs), for example, 108a, 108b, 108c, 108d and 108e. In the C-RAN 100, in some embodiments, the RAU 106 and the RCC 102 performs baseband signal processing and the RRUs perform the base band to radio frequency (RF) conversion or vice-versa (e.g., similar to RF front end). The RRUs in C-RAN systems are therefore different from the traditional eNodeBs, which comprises both baseband processing and RF signal processing. In some embodiments, the RAU 106 and the RCC 102 are coupled to one another by a fronthaul interface (FI) network 110. In some embodiments, in a C-RAN comprising a plurality of RRSs, the FI network 110 can be shared by the plurality of RRSs in a statistical multiplexing manner. In some embodiments, the FI network 110 is based on Ethernet, forming the next generation fronthaul interface (NGFI). In some embodiments, the FI network 110 and the NGFI are the same.

In one embodiment, the RCC 102 is configured to perform a downlink (DL) data transfer and an uplink (UL) data transfer with one or more UEs in a coverage area of the RRS 104. In some embodiments, the RCC 102 is configured to generate a first scheduling result for scheduling one or more UEs (not shown) in the coverage area of the RAU 106 for both DL data transfer and UL data transfer by a DL/UL scheduling process at the RCC 102. In some embodiments, the first scheduling result from the RCC 102 comprises scheduling information for all UEs in the coverage area of the Cloud-RAN 100 and is generated based on a data traffic information for the respective UEs. In some embodiments, the RAU 106 is configured to generate a second scheduling result for scheduling the one or more UEs in the coverage area of the RAU 106 for both DL data transfer and UL data transfer based on a DL/UL scheduling process at the RAU 106. In some embodiments, the RAU 106 is further configured to selectively schedule the one or more UEs in the coverage area of the RAU 106, based on the first scheduling result from the RCC 102 or the second scheduling result or an integration of the first scheduling result and the second scheduling result, depending on whether the first scheduling result from the RCC 102 is received at the RAU 106 before the start of a downlink (DL) layer 1 transmission processing at the RAU 106.

In some embodiments, for example, the RAU 106 is configured to selectively schedule a select UE from the one or more UEs in the coverage area of the RAU 106, based on the first scheduling result from the RCC 102 or an integration of the first scheduling result and the second scheduling result, to generate a selective scheduling result, when the first scheduling result from the RCC 102 is received at the RAU 106 before the start of a downlink (DL) layer 1 transmission processing at the RAU 106. In other embodiments, the RAU 106 is configured to schedule the select UE from the one or more UEs in the coverage area of the RAU 106, based on the second scheduling result of the RAU 106, when the first scheduling result from the RCC 102 is not received at the RAU 106 before the start of the DL layer 1 transmission processing at the RAU 106. In some embodiments, the selective scheduling result at the RAU 106 comprises a DL selective scheduling result for scheduling the select UE for DL data transfer or a UL selective scheduling result for scheduling the select UE for UL data transfer. In some embodiments, the RAU 106 is further configured to transmit a final scheduling result comprising the second scheduling result or the selective scheduling result to the RCC 102.

Figure 2:
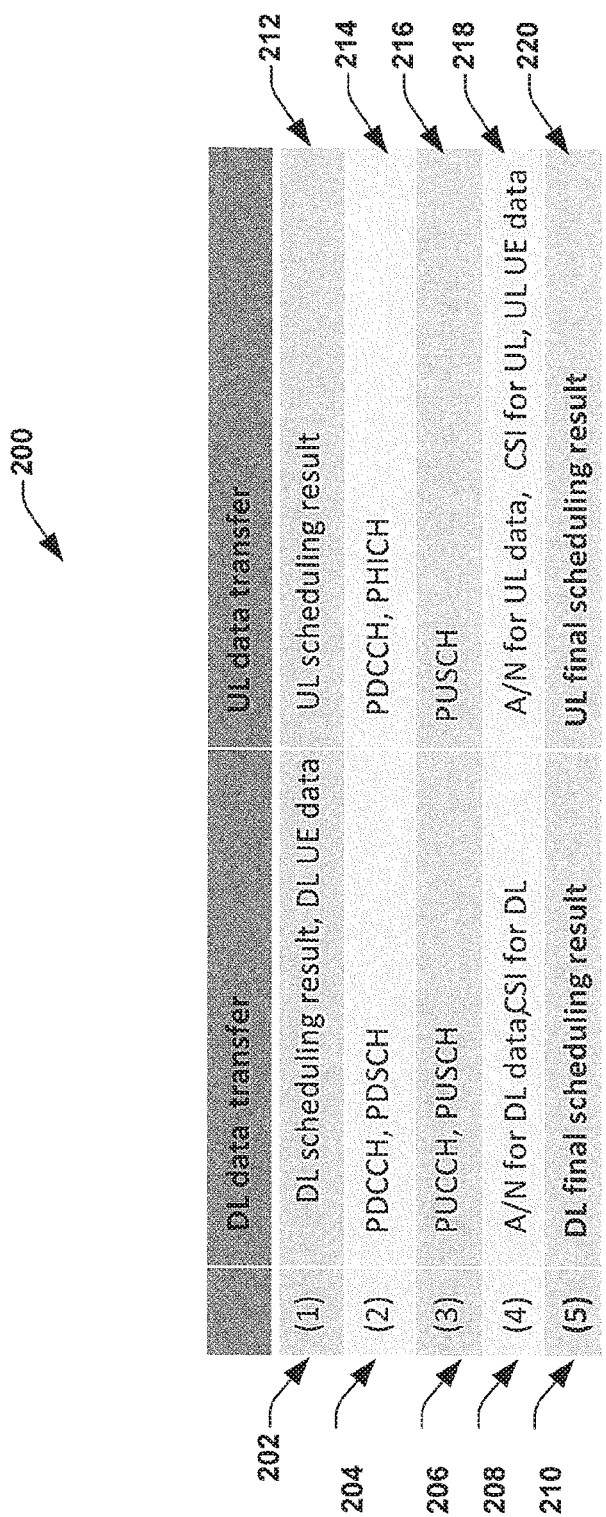
FIG. 2 shows a table that depicts a message transfer associated with the DL data transfer and the UL data transfer in the C-RAN, according to one embodiment of the disclosure.

The message transfer associated with the DL data transfer and the UL data transfer in the C-RAN 100 of FIG. 1 is explained herein in conjunction with table 200 in FIG. 2. In the embodiment of FIG. 1, we consider an HARQ process associated with a DL data transfer from the RCC 102 to a UE A (not shown) in a coverage area of the RRU 108b and an HARQ process associated with an UL data transfer from the UE A in the coverage area of the RRU 108b to the RCC 102. For the DL data transfer, the RCC 102 is configured to transmit a message (1) 112 to the RAU 106 via the FI 110. In some embodiments, the message (1) 112 comprises a DL first scheduling result for scheduling the UE A and a DL UE data (i.e., the downlink data), as shown in row 202 in FIG. 2. The RAU 106 is configured to perform a DL scheduling process and a DL Tx L1 processing on the received DL UE data and transmit a message (2) 114 to the UE A via the RRU 108b. In some embodiments, the message (2) 114 comprises the DL final scheduling result generated based on the DL scheduling process at the RAU 106 and a processed DL UE data generated based on the DL TX L1 processing at the RAU 106. In some embodiments, the final scheduling result is transmitted using a physical downlink control channel (PDCCH) and the processed DL UE data is transmitted using a physical downlink shared channel (PDSCH), as shown in row 204 in FIG. 2.

The RAU 106 is further configured to receive a message (3) 116 from the UE A via the RRU 108b. In some embodiments, the message (3) 116 comprises an ACK/NACK result from the UE A for the DL UE data and a CSI for the UE A. In some embodiments, the ACK/NACK result comprises an ACK, when there is no error in the DL UE data received at the UE A and in other embodiments, the ACK/NACK result comprises a NACK, when there is an error in the DL UE data received at the UE A. In some embodiments, the ACK/NACK result and the CSI are transmitted using a physical uplink control channel (PUCCH) or a physical uplink shared channel (PUSCH) as shown in row 206 in FIG. 2. The RAU 106 is further configured to transmit a message (4) 118 to the RCC 102 via the FI 110. In some embodiments, for DL data transfer, the message (4) 118 that comprises the ACK/NACK result and the CSI from the RAU 106 as shown in row 208 in FIG. 2. Further, the RAU 106 is configured to transmit a message (5) 120 to the RCC 102 via the FI 110. In some embodiments, the message (5) 120 comprises the DL final scheduling result from the RAU 106 as shown in row 210 in FIG. 2.

For the UL data transfer, the RCC 102 is configured to transmit the message (1) 112 to the RAU 106 via the FI 110. In some embodiments, the message (1) 112 comprises a UL first scheduling result for scheduling the UE A, as shown in row 212 in FIG. 2. The RAU 106 is configured to perform a DL Tx L1 processing and transmit a message (2) 114 to the UE A via the RRU 108b. In some embodiments, the message (2) 114 comprises the UL final scheduling result generated at the RAU 106 based on a DL/UL scheduling process at the RAU 106. In some embodiments, the UL final scheduling result is transmitted using a physical downlink control channel (PDCCH) or the physical hybrid-ARQ indicator channel (PHICH), as shown in row 214 in FIG. 2.

The RAU 106 is further configured to receive a message (3) 116 from the UE A via the RRU 108b. In some embodiments, the message (3) 116 comprises a UL UE data from the UE A. In some embodiments, the UL UE data is transmitted using a physical uplink shared channel (PUSCH), as shown in row 216 of FIG. 2. In some embodiments, the RAU 106 is configured to generate an ACK/NACK result and a CSI for the UE A, based on the UE UL data received from the UE A. In some embodiments, the ACK/NACK result comprises an ACK, when there is no error in the UL UE data received at the RAU 106 and in other embodiments, the ACK/NACK result comprises a NACK, when there is error in the UL UE data received at the RAU 106. The RAU 106 is further configured to transmit a message (4) 118 to the RCC 102 via the FI 110. In some embodiments, the message (4) 118 comprises the ACK/NACK result and the CSI for the UL UE data, generated at the RAU 106. Further, in some embodiments, the message (4) 118 comprises a processed UL UE data from the RAU 106 as shown in row 218 in FIG. 2. Further, the RAU 106 is configured to transmit a message (5) 120 to the RCC 102 via the FI 110. In some embodiments, the message (5) 120 comprises a UL final scheduling result from the RAU 106 as shown in row 220 in FIG. 2.

Figure 3:
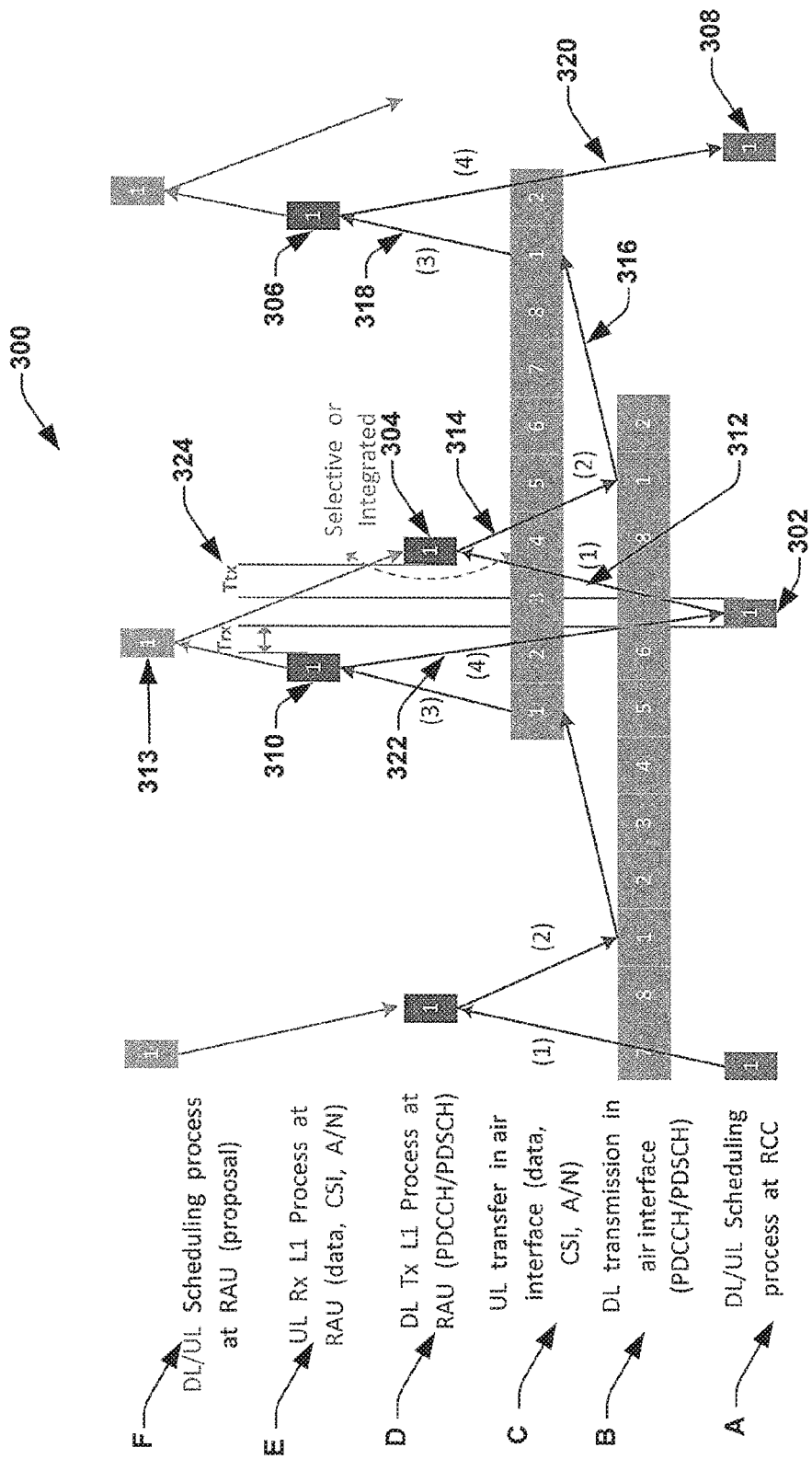
FIG. 3 shows a process flow diagram of an HARQ process for both DL data transfer and UL data transfer in an FI-based C-RAN architecture, according to one embodiment of the disclosure.

FIG. 3 shows a process flow diagram of an HARQ process 300 for both DL data transfer and UL data transfer in an FI-based C-RAN architecture, according to one embodiment of the disclosure. The FIG. 3 further depicts a functional split of the various components in the FI-based C-RAN architecture. The message transfer in FIG. 3 is similar to the message transfer in FIGS. 1 and 2, as described above. The process flow in a typical FI-based C-RAN, for example C-RAN 100 in FIG. 1 comprises a DL/UL scheduling process at the RCC 102 followed by a DL transmission L1 processing at the RAU 106. In some embodiments, the process flow further comprises a DL/UL scheduling at the RAU 106, based on which the DL transmission L1 processing is performed at the RAU 106. The process flow further comprises a DL transmission in air interface by which a data or a control signal or both is transmitted from the RAU 106 to a UE via an RRU in the coverage area of the RAU 106. The process flow further comprises a UL transfer in the air interface by which the UE transmits an ACK/NACK result, CSI or data back to the RAU 106 via an RRU. For example, in DL data transfer, the UE transmits ACK/NACK result or CSI to the RAU 106 and for UL data transfer, the UE transmits data to the RAU 106. In addition, the process flow comprises a UL receive layer 1 processing at the RAU 106 by which the received data, ACK/NACK result or CSI are processed before the next transmission/re-transmission.

Now referring to FIG. 3, the process flow diagram 300 is explained herein with reference to the process flow in the FI-based C-RAN 100 explained above. At block 302, a DL/UL scheduling process A is performed at the RCC, thereby generating a first scheduling result. In some embodiments, the first scheduling result is generated based on an ACK/NACK result or a CSI of a previous transmission or re-transmission, received from the RAU via the message (4) 322 at the RCC. The first scheduling result is then transmitted from the RCC to the RAU via the message (1) 312. For DL data transfer, the message (1) 312 further comprises a DL UE data. At block 304, a DL Tx L1 process D is performed at the RAU based on a final scheduling result at the RAU to generate a processed DL UE data. In some embodiments, the final scheduling result is generated at the RAU by a DL/UL scheduling process F at the RAU as explained above in FIG. 1. The processed DL UE data or the final scheduling result or both are then transmitted to a UE in the coverage area of the RAU via message (2) using DL transmission in the air interface B.

In response, the UE transmits an ACK/NACK result and/or a CSI information in the case of DL data transfer and transmits a UL UE data in the case of UL data transfer, by a UL transmission through the air interface C. At block 306, the ACK/NACK result, the CSI information and/or UL UE data is received/generated at the RAU. Further, the ACK/NACK result and the CSI or UL UE data is transmitted from the RAU to the RCC via the message (4) 320. In some embodiments, the final scheduling result at the RAU is also transmitted to the RCC.

In some embodiments, the final scheduling result at the RAU is generated based on the first scheduling result from the RCC or a second scheduling result at the RAU or both. In some embodiments, the second scheduling result is generated at the RAU based on the ACK/NACK result or the CSI of a previous transmission or re-transmission from the UL RX L1 process E (see block 310) at the RAU. Therefore, in some embodiments, the second scheduling result is generated at the RAU based on a DL/UL scheduling process F of the RAU before the start of the DL Tx L1 processing at the RAU for a new transmission/re-transmission, for example, at the block 313 and is therefore readily available at the RAU during the DL Tx L1 processing D of the current transmission (i.e., at block 304). In some embodiments, the DL/UL scheduling process F comprises generating the second scheduling result at the RAU and generating the final scheduling result at the RAU based on the second scheduling result.

The final scheduling result is generated in some embodiments, based on some predetermined criteria. For example, in one embodiment, when the first scheduling result from the RCC is not available at the RAU, before the start of the DL Tx L1 process D at block 304, that is, when the time taken to transmit the DL first scheduling result from the RCC to the RAU, Ttx 324 exceeds a predetermined threshold, the final scheduling result comprises the second scheduling result at the RAU. In some embodiments, when the first scheduling result from the RCC is available at the RAU, before the start of the DL Tx L1 process at block 304, the final scheduling result comprises the first scheduling result from the RCC or an integration of the first scheduling result and the second scheduling result. In the embodiments wherein both the first scheduling result from the RCC and the second scheduling result are available at the RAU during the DL Tx L1 process D at block 304, a predetermined algorithm is used to determine the final scheduling result. In such embodiments, the final scheduling result comprises the first scheduling result from the RAU or an integration of the first scheduling result and the second scheduling result.

Figure 4:
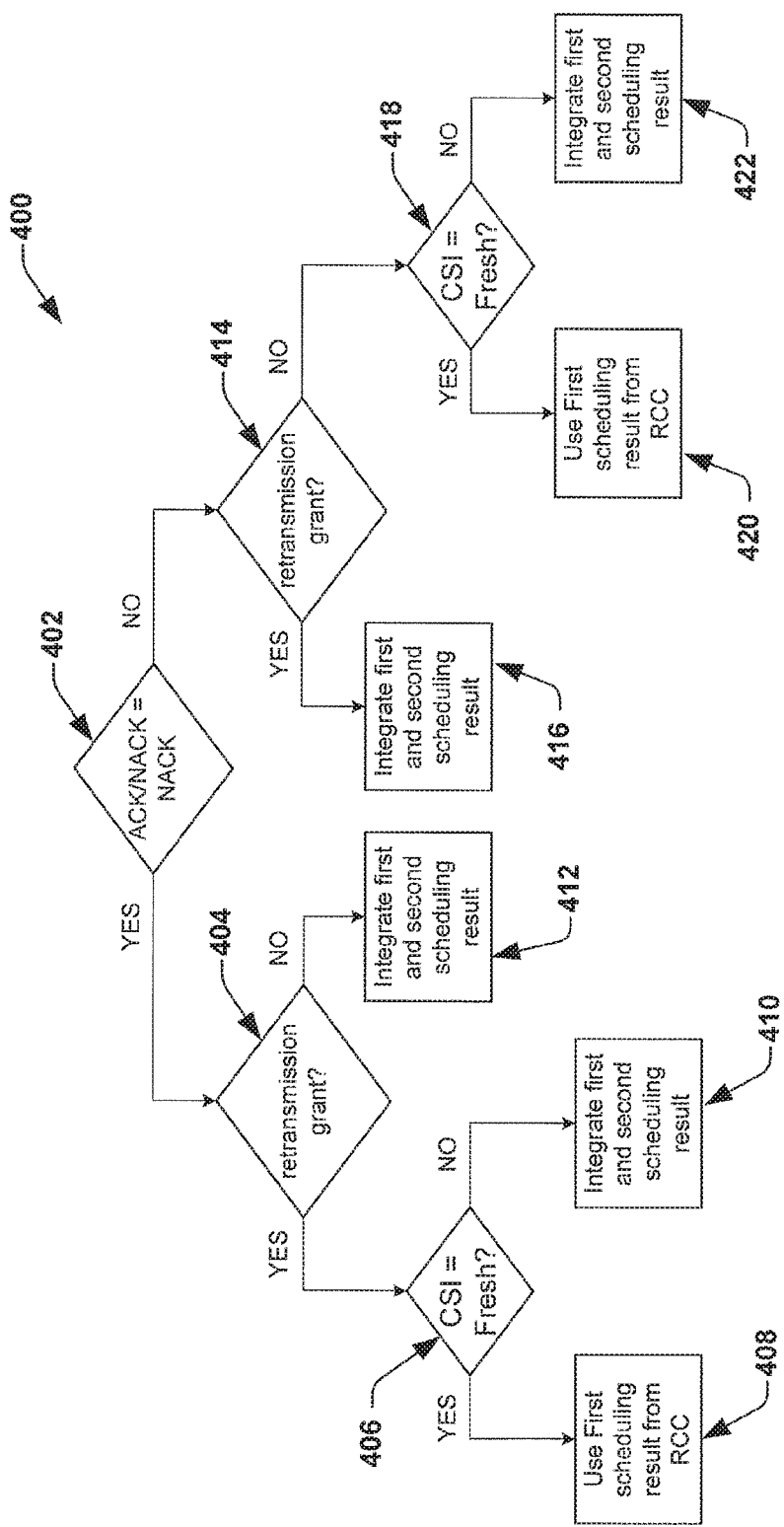
FIG. 4 shows an example algorithm for determining the final scheduling result at the RAU for scheduling a UE in an FI-based C-RAN network architecture, according to one embodiment of the disclosure.

FIG. 4 shows an example algorithm 400 for determining the final scheduling result at the RAU for scheduling a UE in an FI-based C-RAN network architecture, according to one embodiment of the disclosure. The algorithm 400 is implemented at the RAU when both a first scheduling result from the RCC and the second scheduling result at the RAU are available to perform the UE scheduling. The algorithm 400 can be implemented at the RAU for an HARQ process associated with both UL data transfer and DL data transfer. At 402, the ACK/NACK result of a corresponding HARQ process is determined. If NACK, the algorithm proceeds to 404. At 404, a determination is made whether the first scheduling result from the RCC comprises a retransmission grant. If No, the algorithm proceeds to 412, where the RAU inserts the second scheduling result for the corresponding HARQ process into the first scheduling result from the RCC (i.e., an integration of the first and the second scheduling results). If yes, the algorithm proceeds to 406, where a determination is made whether a CSI used at the RCC is fresh. In some embodiments, the freshness of a CSI at the RCC is indicated by a reception time of the CSI at the RCC. If yes, the algorithm proceeds to 408, where the first scheduling result from the RCC is used at the RAU to schedule the UE. If No, the algorithm proceeds to 410, where the RAU replaces the first scheduling result for the HARQ process with the second scheduling result for the HARQ process in the first scheduling result from the RCC. In some embodiment, if the CSI freshness of the first scheduling result is unknown, the RAU assumes the CSI of the first scheduling result is sufficient and uses the first scheduling result from RCC. In some embodiments, the algorithm above is typically followed for UL data transfer as HARQ retransmission is not an important issue in DL data transfer. Since DL HARQ is asynchronous, DL retransmission can be performed in the scheduling result of the next subframe.

At 402, if the ACK/NACK result is ACK, the algorithm proceeds to 414, where a determination at the RAU is made whether the first scheduling result from the RCC comprises a retransmission grant. If yes, the algorithm proceeds to 416, where the RAU removes the first scheduling result for the HARQ process or replace with the second scheduling result for HARQ process in the first scheduling result of the RCC (i.e., an integration of the first and the second scheduling results). If No, the algorithm proceeds to 418, where a determination is made whether a CSI used at the RCC is fresh. If yes, the algorithm proceeds to 420, where the first scheduling result from the RCC is used to schedule the UE. If No, the algorithm proceeds to 422, where the RAU replaces the first scheduling result for the HARQ process with the second scheduling result for the HARQ process in the first scheduling result from the RCC. In some embodiment, if the CSI freshness of the first scheduling result is unknown, the RAU assumes the CSI of the first scheduling result is sufficient and uses the first scheduling result from RCC.

The algorithm 400 above depicts one non-limiting way of determining the final scheduling result at the RAU. Alternatively, in other embodiments, the final scheduling result can be determined at the RAU differently. For example, in one embodiment, both the first scheduling result from the RCC and the second scheduling result by the RAU are available at the RAU, a freshness of the CSI alone is used to generate the final scheduling result. For example, if the CSI used at the RCC is determined to be sufficiently fresh, the first scheduling result from the RCC is used to schedule the UE. However, if the CSI used at the RCC is determined to be obsolete, the first scheduling result by the RCC corresponding to the obsolete CSI is replaced by the second scheduling result 522 by the RAU for the same UE.

Figure 5:
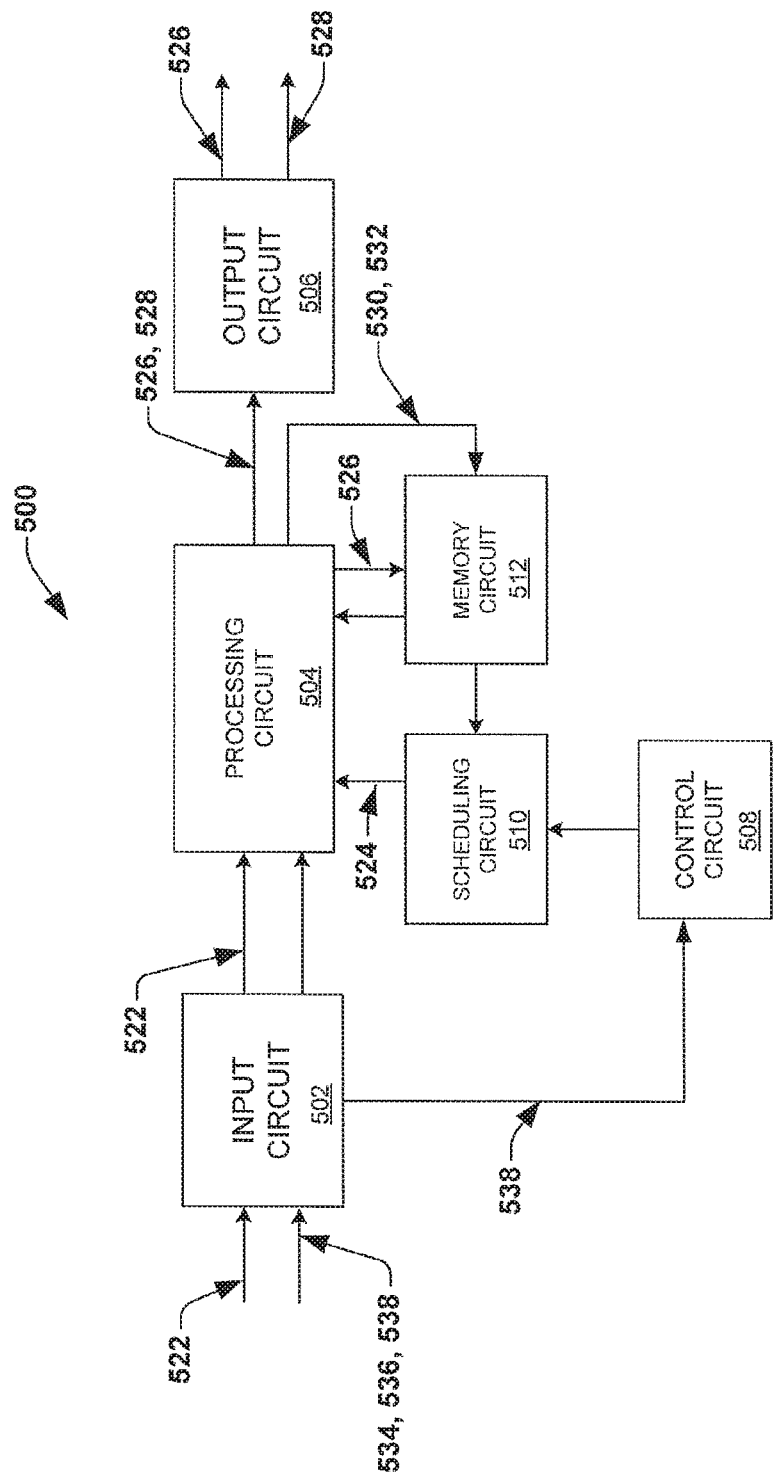
FIG. 5 illustrates a block diagram of an apparatus for use in a radio aggregation unit (RAU) of a cloud radio access network (Cloud-RAN or C-RAN), according to one embodiment of the disclosure.

FIG. 5 illustrates a block diagram of an apparatus 500 for use in a radio aggregation unit (RAU) of a cloud radio access network (Cloud-RAN or C-RAN), according to one embodiments of the disclosure. The apparatus 500 is explained herein with reference to the cloud-RAN 100 of FIG. 1, comprising an RCC 102 and an RRS 104 having an RAU 106 associated therewith. However, in other embodiments, the C-RAN 100 can comprise a plurality of RRSs each having an RAU associated therewith. The apparatus 500 within an RAU comprises an input circuit 502, a processing circuit 504 and an output circuit 506. Further, the apparatus 500 comprises a scheduling circuit 510 coupled to the processing circuit 504, a memory circuit 512 and a control circuit 508. In some embodiments, the input circuit 502 is configured to receive a first scheduling result from an RCC. In some embodiments, the first scheduling result is configured to schedule one or more user equipments (UEs) in a coverage area of the RAU. For example, in the C-RAN 100 of FIG. 1, an input circuit within the RAU 106 is configured to receive a first scheduling result from the RCC 102. In some embodiments, the input circuit 502 is further configured to receive PUCCH and PUSCH from the one or more UEs in the coverage area of the RAU.

In some embodiments, the scheduling circuit 510 is configured to generate a second scheduling result 524 for scheduling the one or more UEs in the coverage area of the RAU. The processing circuit 504 is coupled to the input circuit 502 and the scheduling circuit 510 and is configured to generate a final scheduling result 526 for scheduling the one or more UEs in the coverage area of the RAU, based on the first scheduling result 522 and the second scheduling result 524, as explained above. In some embodiments, the processing circuit 504 is further configured to perform a DL Tx L1 processing based on the final scheduling result 526. The output circuit 506 is coupled to the processing circuit 504 and is configured to transmit the final scheduling result 526 and a signal associated with the DL Tx L1 processing 528 to the one or more UEs in the coverage area of the RAU via the output circuit 506. In some embodiments, the signal associated with the DL Tx L1 processing comprises PDCCH and PDSCH. In some embodiments, the output circuit 506 is further configured to transmit the final scheduling result 526 to the RCC. The memory circuit 512 is coupled to the processing circuit 504 and is configured to store the final scheduling result 526 determined at the processing circuit 504. In some embodiments, the memory circuit 512 is further configured to store an ACK/NACK result 530 and a CSI 532 for an HARQ process associated with a DL data transfer and an UL data transfer. In some embodiments, for UL data transfer, the ACK/NACK result 530 and the CSI 532 are generated at the processing circuit 504 and for DL data transfer, the ACK/NACK result 530 and the CSI 532 are received at the processing circuit 504 via the input circuit 502 from the one or more UEs in the coverage area of the RAU.

In some embodiments, the scheduling circuit 510 is configured to generate the second scheduling result 524 for an HARQ process based on the ACK/NACK result 530 and the CSI 532 of the respective HARQ process stored in the memory circuit 512. Further, in some embodiments, the final scheduling result 526 of the HARQ process is also generated based on the ACK/NACK result 530 of the respective HARQ process stored in the memory circuit 512, according to the algorithm 400 described above in FIG. 4. In some embodiments, the input circuit 502 is further configured to receive from the RCC, an information 534 associated with a channel state information (CSI) used at the RCC for an HARQ process (in order to determine the first scheduling result 522 at the RCC), wherein the information 534 associated with the CSI indicates a freshness of the CSI. In some embodiments, the final scheduling result 526 is determined further based on the freshness of the CSI 534, based on the algorithm 400. In some embodiments, the input circuit 502 is further configured to receive a quality of service (QoS) information 536 that defines a time-critical service and a time non-critical service associated with the network.

The control circuit 508 is coupled to the scheduling circuit 510 and is configured to selectively activate the scheduling circuit 510 based on a load information 538 of the C-RAN or the FI-network. In some embodiments, when the FI-network is lightly loaded, the RAU scheduling function is deactivated. Deactivation of the scheduling function at the RAU, in some embodiments, can be achieved by deactivating the scheduling circuit 510. In such embodiments, the processing circuit 504 is configured to schedule the one or more UEs based solely on the first scheduling result 522 from the RCC.

Figure 6:
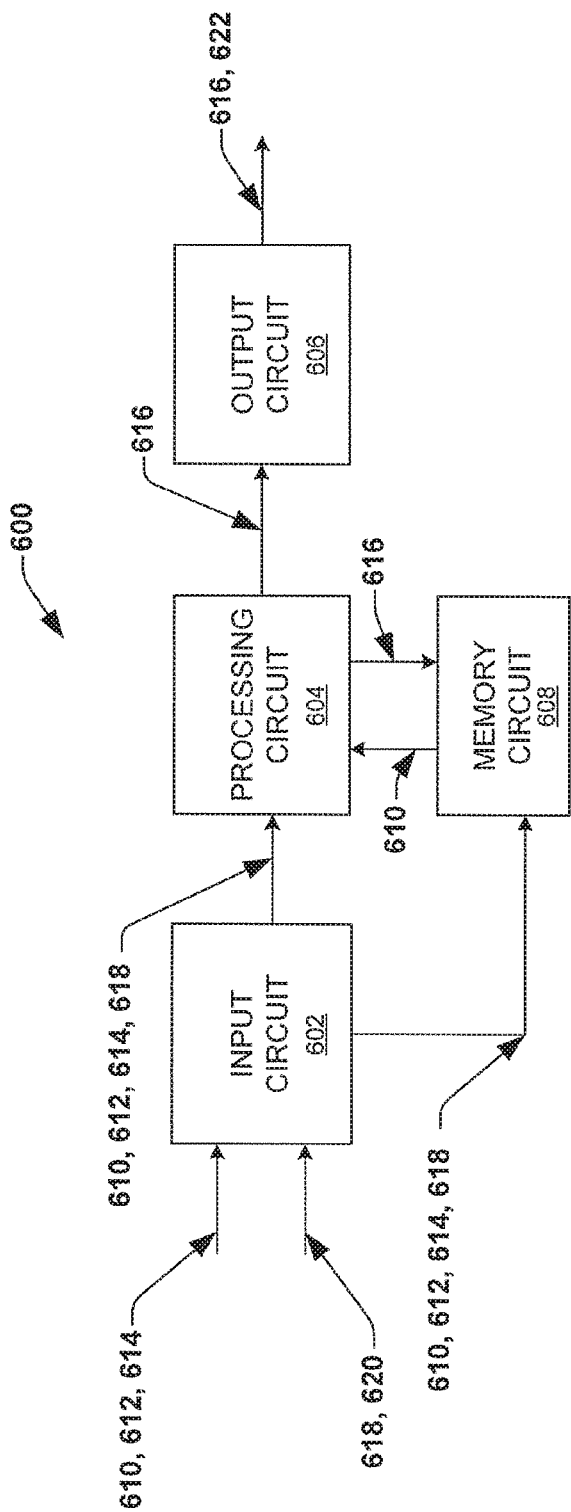
FIG. 6 illustrates a block diagram of an apparatus for use in a radio cloud center (RCC) of a cloud radio access network (Cloud-RAN or C-RAN), according to one embodiment of the disclosure.

FIG. 6 illustrates a block diagram of an apparatus 600 for use in a radio cloud center (RCC) of a cloud radio access network (Cloud-RAN or C-RAN), according to one embodiment of the disclosure. The apparatus 600 is explained herein with reference to the cloud-RAN 100 if FIG. 1, comprising an RCC 102 and an RRS 104 having an RAU 106 associated therewith. However, in other embodiments, the C-RAN 100 can comprise a plurality of RRSs each having an RAU associated therewith. The apparatus 600 comprises an input circuit 602, a processing circuit 604, an output circuit 606 and a memory circuit 608. The input circuit 602 is configured to receive a final scheduling result 610 from a select RAU, for example, RAU 106, in the cloud-RAN 100. In some embodiments, the final scheduling result 610 is same as the final scheduling result 526 in FIG. 5. In some embodiments, the final scheduling result 610 in FIG. 6 comprises a scheduling information for one or more user equipments (UEs) in a coverage area of the select RAU. Further, in some embodiments, the input circuit 602 is further configured to receive an ACK/NACK result 612 and a CSI information 614 associated with a hybrid automatic repeat request (HARQ) process from the RAU. In some embodiments, the ACK/NACK result 612 and the CSI information 614 is same as the ACK/NACK result 530 and the CSI 532 in FIG. 5.

The processing circuit 604 is coupled to the input circuit 602 and is configured to generate a first scheduling result 616 for scheduling the one or more UEs for a next transmission/re-transmission, based on the final scheduling result 610, the ACK/NACK result 612 and the CSI 614 of the current transmission/re-transmission. The output circuit 606 is coupled to the processing circuit 604 and is configured to transmit the first scheduling result 616 to the select RAU. The memory circuit 608 is coupled to the processing circuit 604 and the input circuit 602, and is configured to store the first scheduling result 616 generated at the processing circuit 604 and the final scheduling result 610 received at the input circuit 602 from the RAU. In some embodiments, the input circuit 602 is further configured to receive a data traffic information 618 for the one or more UEs in the coverage area of the select RAU, from a network controller, which is also then utilized in the processing circuit 604 to generate the first scheduling result 616. Further, in some embodiments, the input circuit 602 is configured to receive a UL UE data 620 from the one or more UEs in the coverage area of the select RAU via the select RAU, for UL data transfer. In some embodiments, the output circuit 606 is further configured to transmit DL UE data 622 to the one or more UEs in the coverage area of the select RAU via the select RAU, for DL data transfer.

Figure 7:
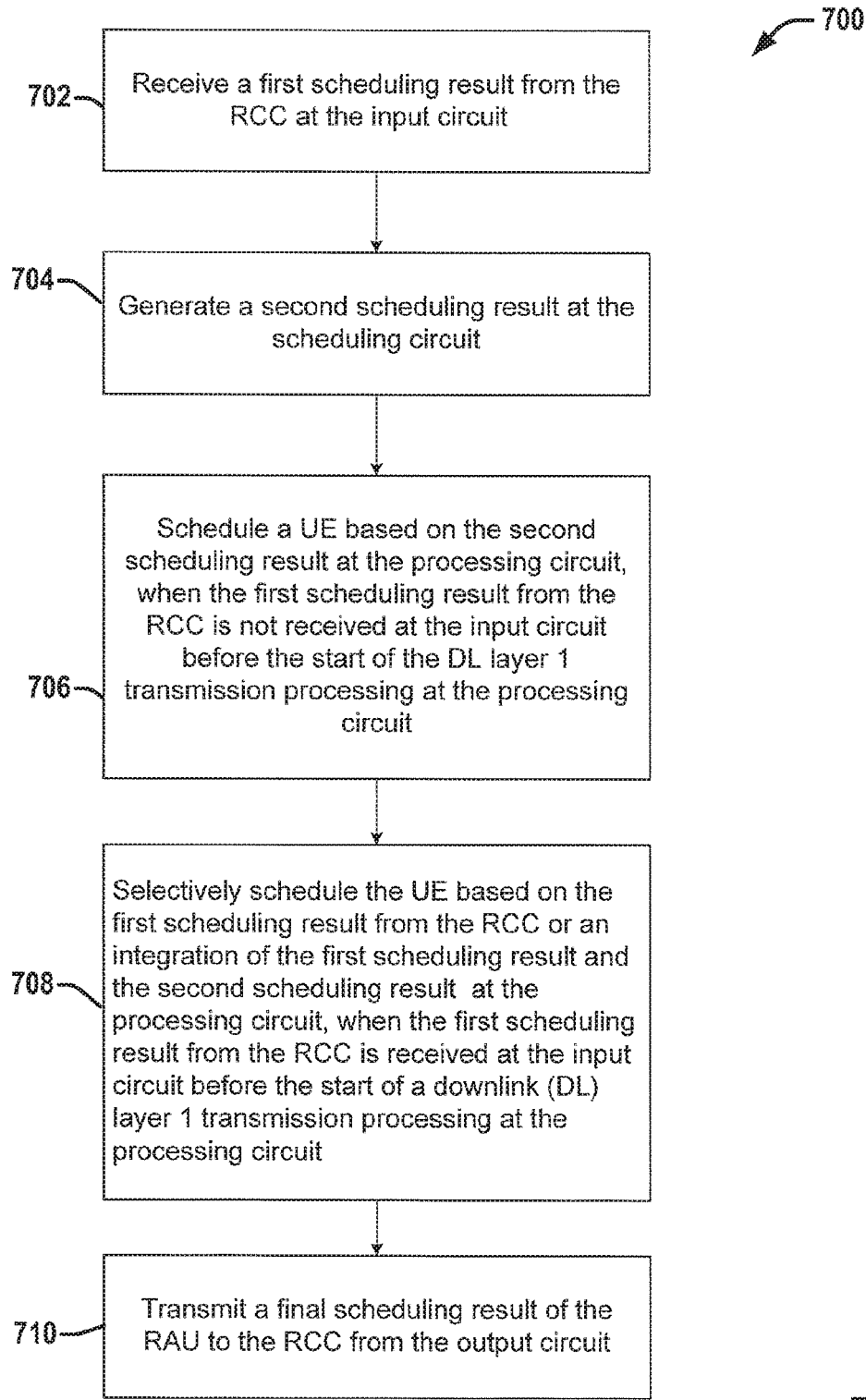
FIG. 7 shows a flowchart for a method for use in a radio aggregation unit (RAU) of a cloud radio access network (C-RAN), according to one embodiment of the disclosure.

FIG. 7 shows a flowchart for a method 700 for use in a radio aggregation unit (RAU) of a cloud radio access network (C-RAN), according to one embodiment of the disclosure. The method 700 is described herein with reference to the apparatus 500 in FIG. 5. At 702, a first scheduling result from the RCC is received at the input circuit 502. At 704, a second scheduling result is generated at the scheduling circuit 510. At 706, a UE in the coverage area of the RAU is scheduled based on the second scheduling result at the RAU at the processing circuit 504, when the first scheduling result from the RCC is not received at the input circuit 502 before the start of the DL layer 1 transmission processing at the processing circuit 504. At 708, the UE in the coverage area of the RAU is selectively scheduled based on the first scheduling result from the RCC or an integration of the first scheduling result and the second scheduling result, when the first scheduling result from the RCC is received at the input circuit before the start of a downlink (DL) layer 1 transmission processing at the processing circuit 504, thereby generating a selective scheduling result. In some embodiments, the selective scheduling result is generated based on an ACK/NACK result of a corresponding HARQ process available at the RAU, in accordance with a predetermined algorithm. At 710, a final scheduling result of the RAU is transmitted to the RCC from the output circuit 506. In some embodiments, the final scheduling result of the RAU comprises the second scheduling result of the RAU or the selective scheduling result.

Figure 8:
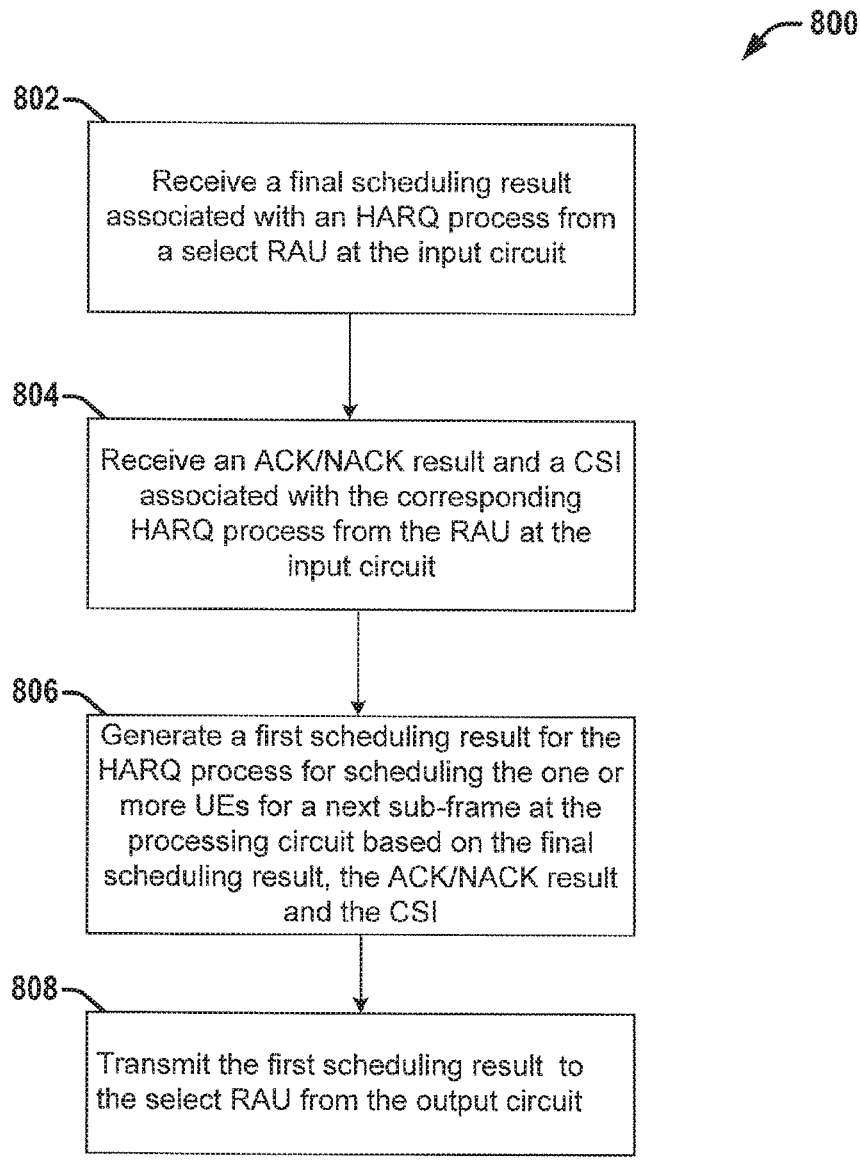
FIG. 8 shows a flowchart for a method for use in a radio receive center (RCC) of a cloud radio access network (C-RAN), according to one embodiment of the disclosure.

FIG. 8 shows a flowchart for a method 800 for use in a radio receive center (RCC) of a cloud radio access network (C-RAN), according to one embodiment of the disclosure. The method 800 is described herein with reference to the apparatus 600 in FIG. 6. At 802, a final scheduling result associated with an HARQ process is received from a select RAU at the input circuit 602. At 804, an ACK/NACK result and a CSI associated with the corresponding HARQ process is received from the RAU at the input circuit 602. At 806, a first scheduling result for the HARQ process for scheduling the one or more UEs for a next sub-frame is generated at the processing circuit 604 based on the final scheduling result, the ACK/NACK result and the CSI. At 808, the first scheduling result is transmitted from the output circuit 606 to the select RAU.

While the methods are illustrated and described above as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the disclosure herein. Also, one or more of the acts depicted herein may be carried out in one or more separate acts and/or phases.

While the apparatus and method has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention.

Examples can include subject matter such as a method, means for performing acts or blocks of the method, at least one machine-readable medium including instructions that, when performed by a machine cause the machine to perform acts of the method or of an apparatus or system for concurrent communication using multiple communication technologies according to embodiments and examples described herein.

Example 1 is an apparatus for use in a radio aggregation unit (RAU) of a cloud radio access network (Cloud-RAN), the cloud-RAN comprising a radio cloud center (RCC) and a plurality of radio remote systems (RRS) coupled to the RCC, wherein each RRS comprises an RAU coupled to a plurality of Remote Radio Units (RRUs), the apparatus comprising an input circuit configured to receive a first scheduling result from the RCC, wherein the first scheduling result is configured to schedule one or more user equipments (UEs) in a coverage area of the RAU; a scheduling circuit configured to generate a second scheduling result for scheduling the one or more UEs in the coverage area of the RAU; a processing circuit operably coupled to the input circuit and the scheduling circuit and configured to selectively schedule a select UE from the one or more UEs in the coverage area of the RAU, based on the first scheduling result from the RCC or an integration of the first scheduling result and the second scheduling result, to generate a selective scheduling result, when the first scheduling result from the RCC is received at the input circuit before the start of a downlink (DL) layer 1 transmission processing at the processing circuit; and schedule the select UE from the one or more UEs in the coverage area of the RAU, based on the second scheduling result of the RAU, when the first scheduling result from the RCC is not received at the input circuit before the start of the DL layer 1 transmission processing at the processing circuit; and an output circuit configured to transmit a signal associated with the downlink (DL) layer 1 transmission processing to an RRU coupled therewith; and transmit a final scheduling result from the processing circuit to the RCC, wherein the final scheduling result comprises the second scheduling result of the RAU or the selective scheduling result.

Example 2 is an apparatus including the subject matter of example 1, further comprising a control circuit configured to selectively activate the scheduling circuit based on a load information of the Cloud-RAN.

Example 3 is an apparatus including the subject matter of examples 1-2, including or omitting elements, wherein the processing circuit is further configured to schedule the select UE based solely on the first scheduling result from the RCC, when the scheduling circuit is deactivated.

Example 4 is an apparatus including the subject matter of examples 1-3, including or omitting elements, wherein the input circuit is further configured to receive a channel state information (CSI) from the select UE for a DL data transfer and the processing circuit is further configured to generate the CSI information for the select UE for a UL data transfer.

Example 5 is an apparatus including the subject matter of examples 1-4, including or omitting elements, wherein the input circuit is further configured to receive from the RCC, an information associated with a channel state information (CSI) of the select UE used at the RCC, wherein the information associated with the CSI indicates a freshness of the CSI.

Example 6 is an apparatus including the subject matter of examples 1-5, including or omitting elements, wherein selectively scheduling the UE comprises using the first scheduling result from the RCC to schedule the select UE, if the CSI associated with the select UE from the RCC is fresh, and replacing the first scheduling result for the select UE from the RCC by the second scheduling result by the RAU for the select UE, if the CSI associated with the select UE from the RCC is not fresh.

Example 7 is an apparatus including the subject matter of examples 1-6, including or omitting elements, wherein the input circuit is further configured to receive ACK/NACK result of a hybrid automatic repeat request (HARQ) process associated with a downlink (DL) data transfer from the select UE and the processing circuit is further configured to generate ACK/NACK result of an uplink (UL) data transfer for the select UE.

Example 8 is an apparatus including the subject matter of examples 1-7, including or omitting elements, wherein selectively scheduling the select UE comprises using the first scheduling result from the RCC to schedule the select UE for a HARQ process associated with an uplink (UL) data transfer from the select UE, when the ACK/NACK result of the respective HARQ process is NACK and the first scheduling result from the RCC includes a retransmission grant and the CSI associated with the select UE from the RCC is fresh.

Example 9 is an apparatus including the subject matter of examples 1-8, including or omitting elements, wherein selectively scheduling the select UE comprises replacing the first scheduling result from the RCC by the second scheduling result of the RAU for the select UE for a HARQ process associated with an uplink (UL) data transfer from the select UE, when the ACK/NACK result of the respective HARQ process is NACK and the first scheduling result from the RCC includes a retransmission grant and the CSI associated with the select UE from the RCC is not fresh.

Example 10 is an apparatus including the subject matter of examples 1-9, including or omitting elements, wherein selectively scheduling the select UE comprises inserting the second scheduling result of the RAU for the select UE into the first scheduling result from the RCC for a HARQ process associated with an uplink (UL) data transfer from the select UE, when the ACK/NACK result of the respective HARQ process is NACK and the first scheduling result from the RCC does not include a retransmission grant.

Example 11 is an apparatus including the subject matter of examples 1-10, including or omitting elements, wherein selectively scheduling the select UE comprises using the first scheduling result from the RCC to schedule the select UE for a HARQ process associated with an uplink (UL) data transfer from the select UE, and a HARQ process associated with an downlink (DL) data transfer to the select UE, respectively, when the ACK/NACK result of the respective HARQ process is ACK and the first scheduling result from the RCC does not include a retransmission grant and the CSI associated with the select UE from the RCC is fresh.

Example 12 is an apparatus including the subject matter of examples 1-11, including or omitting elements, wherein selectively scheduling the select UE comprises replacing the first scheduling result from the RCC by the second scheduling result of the RAU for the select UE for a HARQ process associated with an uplink (UL) data transfer from the select UE and a HARQ process associated with an downlink (DL) data to the select UE, respectively, when the ACK/NACK result of the respective HARQ process is ACK and the first scheduling result from the RCC does not include a retransmission grant and the CSI associated with the select UE from the RCC is not fresh.

Example 13 is an apparatus including the subject matter of examples 1-12, including or omitting elements, wherein selectively scheduling the select UE comprises removing the first scheduling result for the select UE from the first scheduling result from the RCC, or replacing the first scheduling result from the RCC by the second scheduling result of the RAU for a HARQ process associated with an uplink (UL) data transfer from the select UE and a HARQ process associated with an downlink (DL) data to the select UE, respectively, when the ACK/NACK result of the respective HARQ process is ACK and the first scheduling result from the RCC include a retransmission grant.

Example 14 is an apparatus including the subject matter of examples 1-13, including or omitting elements, wherein the output circuit is further configured to transmit the ACK/NACK result and the CSI information for the UL data transfer or the DL transfer or both, to the RCC.

Example 15 is an apparatus including the subject matter of examples 1-14, including or omitting elements, wherein the input circuit is further configured to receive a quality of service (QoS) information that defines a time-critical service and a time non-critical service associated with the network.

Example 16 is an apparatus including the subject matter of examples 1-15, including or omitting elements, wherein selectively scheduling the select UE at the processing unit comprises using the first scheduling result from the RCC to schedule the time non-critical service, and using the first scheduling result from the RCC or an integration of the first scheduling result and the second scheduling result to schedule the time-critical service.

Example 17 is an apparatus including the subject matter of examples 1-16, including or omitting elements, wherein the first scheduling result from the RCC comprises scheduling information for all UEs in the coverage area of the Cloud-RAN and is generated based on a data traffic information for the respective UEs.

Example 18 is an apparatus including the subject matter of examples 1-17, including or omitting elements, further comprising a memory circuit configured to store the first scheduling result and the second scheduling result.

Example 19 is an apparatus including the subject matter of examples 1-18, including or omitting elements, wherein the first scheduling result from the RCC comprises scheduling information for both hybrid automatic repeat request (HARQ) transmission and re-transmission.

Example 20 is an apparatus including the subject matter of examples 1-19, including or omitting elements, wherein the first scheduling result from the RCC comprises scheduling with all available physical resource blocks (PRBs).

Example 21 is an apparatus including the subject matter of examples 1-20, including or omitting elements, wherein the first scheduling result from the RCC comprises scheduling with all beamforming weights.

Example 22 is an apparatus including the subject matter of examples 1-21, including or omitting elements, wherein the second scheduling result from the RAU comprises scheduling information only for hybrid automatic repeat request (HARQ) re-transmission.

Example 23 is an apparatus including the subject matter of examples 1-22, including or omitting elements, wherein the second scheduling result from the RAU comprises scheduling with a certain part of the available physical resource blocks (PRBs).

Example 24 is an apparatus including the subject matter of examples 1-23, including or omitting elements, wherein the second scheduling result from the RAU comprises scheduling with a certain part of the available physical resource blocks (PRBs).

Example 25 is an apparatus including the subject matter of examples 1-24, including or omitting elements, wherein the second scheduling result from the RAU comprises scheduling information only for cell-center UEs.

Example 26 is a computer-readable storage device storing computer-executable instructions that, in response to execution, cause a radio aggregation unit (RAU) of a cloud radio access network (Cloud-RAN), the cloud-RAN comprising a radio cloud center (RCC) and a plurality of radio remote systems (RRS), wherein each RRS comprises an RAU coupled to a plurality of Remote Radio Units (RRUs), to receive a first scheduling result from the RCC, wherein the first scheduling result is configured to schedule one or more user equipments (UEs) in a coverage area of the RAU; generate a second scheduling result for scheduling the one or more UEs in the coverage area of the RAU; receive an ACK/NACK result and a channel state information (CSI) from a select UE of the one or more UEs for DL data transfer; generate an ACK/NACK result and a channel state information (CSI) for the select UE of the one or more UEs for UL data transfer; selectively schedule the select UE from the one or more UEs in the coverage area of the RAU for DL data transfer and UL data transfer, based on the first scheduling result from the RCC or an integration of the first scheduling result and the second scheduling result, to generate a selective scheduling result, by utilizing the ACK/NACK result and the CSI for the DL data transfer and the UL data transfer, respectively, when the first scheduling result from the RCC is received at the RAU before the start of a downlink (DL) layer 1 transmission processing at the RAU; schedule the select UE from the one or more UEs in the coverage area of the RAU for DL transfer and UL transfer, based on the second scheduling result of the RAU, when the first scheduling result from the RCC is not received at the RAU before the start of the DL layer 1 transmission processing at the RAU; and transmit a final scheduling result to the RCC, wherein the final scheduling result comprises the second scheduling result of the RAU or the selective scheduling result.

Example 27 is a computer-readable storage device including the subject matter of example 26, wherein the selective scheduling of the select UE is performed in accordance with a predetermined algorithm.

Example 28 is an apparatus for use in a radio cloud center (RCC) of a cloud radio access network (Cloud-RAN), the cloud-RAN comprising the RCC and a plurality of radio remote systems (RRS) coupled to the RCC, wherein each RRS comprises a radio aggregation unit (RAU) coupled to a plurality of Remote Radio Units (RRUs), the apparatus comprising an input circuit configured to receive a final scheduling result from a select RAU in the cloud-RAN, wherein the final scheduling result comprises a scheduling information for one or more user equipments (UEs) in a coverage area of the select RAU; and receive an ACK/NACK result and a CSI associated with a hybrid automatic repeat request (HARQ) process from the RAU; a processing circuit coupled to the input circuit and configured to generate a first scheduling result for scheduling the one or more UEs for a next sub-frame, based on the final scheduling result, the ACK/NACK result and the CSI; and an output circuit configured to transmit the first scheduling result to the select RAU.

Example 29 is an apparatus including the subject matter of example 28, wherein the input circuit is further configured to receive a data traffic information for the one or more UEs in the coverage area of the select RAU, from a network controller.

Example 30 is an apparatus including the subject matter of examples 28-29, including or omitting elements, wherein the output circuit is further configured to transmit data to the one or more UEs in the coverage area of the select RAU via the select RAU, for DL data transfer.

Example 31 is an apparatus including the subject matter of examples 28-30, including or omitting elements, wherein the input circuit is further configured to receive data from the one or more UEs in the coverage area of the select RAU via the select RAU, for UL data transfer.

Example 32 is a method for a radio aggregation unit (RAU) of a cloud radio access network (Cloud-RAN), the cloud-RAN comprising a radio cloud center (RCC) and a plurality of radio remote systems (RRS), wherein each RRS comprises an RAU coupled to a plurality of Remote Radio Units (RRUs), the method comprising receiving a first scheduling result from the RCC, wherein the first scheduling result is configured to schedule one or more user equipments (UEs) in a coverage area of the RAU; generating a second scheduling result for scheduling the one or more UEs in the coverage area of the RAU; receiving an ACK/NACK result and a channel state information (CSI) from a select UE of the one or more UEs for DL data transfer; generating an ACK/NACK result and a channel state information (CSI) for the select UE of the one or more UEs for UL data transfer; selectively scheduling the select UE from the one or more UEs in the coverage area of the RAU for DL data transfer and UL data transfer, based on the first scheduling result from the RCC or an integration of the first scheduling result and the second scheduling result, to generate a selective scheduling result, by utilizing the ACK/NACK result and the CSI for the DL data transfer and the UL data transfer, respectively, when the first scheduling result from the RCC is received at the RAU before the start of a downlink (DL) layer 1 transmission processing at the RAU; scheduling the select UE from the one or more UEs in the coverage area of the RAU for DL transfer and UL transfer, based on the second scheduling result of the RAU, when the first scheduling result from the RCC is not received at the RAU before the start of the DL layer 1 transmission processing at the RAU; and transmitting a final scheduling result to the RCC, wherein the final scheduling result comprises the second scheduling result of the RAU or the selective scheduling result.

Example 33 is a method including the subject matter of example 32, wherein the selective scheduling of the select UE is performed in accordance with a predetermined algorithm.

Example 34 is a computer-readable storage device storing computer-executable instructions that, in response to execution, cause a radio aggregation unit (RAU) of a cloud radio access network (Cloud-RAN) to perform the method of example 32.

Example 35 is a computer-readable storage device storing computer-executable instructions that, in response to execution, cause a radio cloud center (RCC) of a cloud radio access network (Cloud-RAN), the cloud-RAN comprising the RCC and a plurality of radio remote systems (RRS) coupled to the RCC, wherein each RRS comprises a radio aggregation unit (RAU) coupled to a plurality of Remote Radio Units (RRUs), to receive a final scheduling result from a select RAU in the cloud-RAN, wherein the final scheduling result comprises a scheduling information for one or more user equipments (UEs) in a coverage area of the select RAU; receive an ACK/NACK result and a CSI associated with a hybrid automatic repeat request (HARQ) process from the RAU; generate a first scheduling result for scheduling the one or more UEs for a next sub-frame, based on the final scheduling result, the ACK/NACK result and the CSI; and transmit the first scheduling result to the select RAU.

Example 36 is a computer-readable storage device including the subject matter of example 35, further causing the RCC to receive a data traffic information for the one or more UEs in the coverage area of the select RAU, from a network controller.

Example 37 is a computer-readable storage device including the subject matter of examples 35-36, including or omitting elements, further causing the RCC to transmit data to the one or more UEs in the coverage area of the select RAU via the select RAU, for DL data transfer.

Example 38 is a computer-readable storage device including the subject matter of examples 35-37, including or omitting elements, further causing the RCC to receive data from the one or more UEs in the coverage area of the select RAU via the select RAU, for UL data transfer.

Various illustrative logics, logical blocks, modules, and circuits described in connection with aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature may have been disclosed with respect to only one of several implementations, such feature may be combined with one or more other features of the other implementations as may be desired and advantageous for any given or particular application.

The invention claimed is:

1. An apparatus for use in a radio aggregation unit (RAU) of a cloud radio access network (Cloud-RAN), the cloud-RAN comprising a radio cloud center (RCC) and a plurality of radio remote systems (RRS) coupled to the RCC, wherein each RRS comprises an RAU coupled to a plurality of Remote Radio Units (RRUs), the apparatus comprising:
   an input circuit configured to receive a first scheduling result from the RCC, wherein the first scheduling result is configured to grant resources for uplink (UL) data transfer and/or downlink (DL) data transfer between the RAU and one or more user equipments (UEs) in a coverage area of the RAU;
   a scheduling circuit configured to generate a second scheduling result, wherein the second scheduling result is configured to grant resources for UL data transfer and/or DL data transfer between the one or more UEs in the coverage area of the RAU;
   a processing circuit operably coupled to the input circuit and the scheduling circuit and configured to:
      selectively schedule a select UE from the one or more UEs in the coverage area of the RAU, based on the first scheduling result from the RCC or an integration of the first scheduling result and the second scheduling result, to generate a selective scheduling result, when the first scheduling result from the RCC is received at the input circuit before the start of a downlink (DL) layer 1 transmission processing at the processing circuit; and
      schedule the select UE from the one or more UEs in the coverage area of the RAU, based on the second scheduling result of the RAU, when the first scheduling result from the RCC is not received at the input circuit before the start of the DL layer 1 transmission processing at the processing circuit; and
   an output circuit configured to:
      transmit a signal associated with the downlink (DL) layer 1 transmission processing to an RRU coupled therewith; and
      transmit a final scheduling result from the processing circuit to the RCC, wherein the final scheduling result comprises the second scheduling result of the RAU or the selective scheduling result.

2. The apparatus of claim 1, further comprising a control circuit configured to selectively activate the scheduling circuit based on a load information of the Cloud-RAN.

3. The apparatus of claim 2, wherein the processing circuit is further configured to schedule the select UE based solely on the first scheduling result from the RCC, when the scheduling circuit is deactivated.

4. The apparatus of claim 1, wherein the input circuit is further configured to receive a channel state information (CSI) from the select UE for a DL data transfer and the processing circuit is further configured to generate the CSI information for the select UE for a UL data transfer.

5. The apparatus of claim 1, wherein the input circuit is further configured to receive from the RCC, an information associated with a channel state information (CSI) of the select UE used at the RCC, wherein the information associated with the CSI indicates a freshness of the CSI.

6. The apparatus of claim 5, wherein selectively scheduling the UE comprises using the first scheduling result from the RCC to schedule the select UE, if the CSI associated with the select UE from the RCC is fresh, and replacing the first scheduling result for the select UE from the RCC by the second scheduling result by the RAU for the select UE, if the CSI associated with the select UE from the RCC is not fresh.

7. The apparatus of claim 5, wherein the input circuit is further configured to receive ACK/NACK result of a hybrid automatic repeat request (HARQ) process associated with a downlink (DL) data transfer from the select UE and the processing circuit is further configured to generate ACK/NACK result of an uplink (UL) data transfer for the select UE.

8. The apparatus of claim 7, wherein selectively scheduling the select UE comprises using the first scheduling result from the RCC to schedule the select UE for a HARQ process associated with an uplink (UL) data transfer from the select UE, when the ACK/NACK result of the respective HARQ process is NACK and the first scheduling result from the RCC includes a retransmission grant and the CSI associated with the select UE from the RCC is fresh.

9. The apparatus of claim 7, wherein selectively scheduling the select UE comprises replacing the first scheduling result from the RCC by the second scheduling result of the RAU for the select UE for a HARQ process associated with an uplink (UL) data transfer from the select UE, when the ACK/NACK result of the respective HARQ process is NACK and the first scheduling result from the RCC includes a retransmission grant and the CSI associated with the select UE from the RCC is not fresh.

10. The apparatus of claim 7, wherein selectively scheduling the select UE comprises inserting the second scheduling result of the RAU for the select UE into the first scheduling result from the RCC for a HARQ process associated with an uplink (UL) data transfer from the select UE, when the ACK/NACK result of the respective HARQ process is NACK and the first scheduling result from the RCC does not include a retransmission grant.

11. The apparatus of claim 7, wherein selectively scheduling the select UE comprises using the first scheduling result from the RCC to schedule the select UE for a HARQ process associated with an uplink (UL) data transfer from the select UE, and a HARQ process associated with an downlink (DL) data transfer to the select UE, respectively, when the ACK/NACK result of the respective HARQ process is ACK and the first scheduling result from the RCC does not include a retransmission grant and the CSI associated with the select UE from the RCC is fresh.

12. The apparatus of claim 7, wherein selectively scheduling the select UE comprises replacing the first scheduling result from the RCC by the second scheduling result of the RAU for the select UE for a HARQ process associated with an uplink (UL) data transfer from the select UE and a HARQ process associated with an downlink (DL) data to the select UE, respectively, when the ACK/NACK result of the respective HARQ process is ACK and the first scheduling result from the RCC does not include a retransmission grant and the CSI associated with the select UE from the RCC is not fresh.

13. The apparatus of claim 7, wherein selectively scheduling the select UE comprises removing the first scheduling result for the select UE from the first scheduling result from the RCC, or replacing the first scheduling result from the RCC by the second scheduling result of the RAU for a HARQ process associated with an uplink (UL) data transfer from the select UE and a HARQ process associated with an downlink (DL) data to the select UE, respectively, when the ACK/NACK result of the respective HARQ process is ACK and the first scheduling result from the RCC include a retransmission grant.

14. The apparatus of claim 4, wherein the output circuit is further configured to transmit the ACK/NACK result and the CSI information for the UL data transfer or the DL transfer or both, to the RCC.

15. The apparatus of claim 1, wherein the input circuit is further configured to receive a quality of service (QoS) information that defines a time-critical service and a time non-critical service associated with the network.

16. The apparatus of claim 15, wherein selectively scheduling the select UE at the processing unit comprises using the first scheduling result from the RCC to schedule the time non-critical service, and using the first scheduling result from the RCC or an integration of the first scheduling result and the second scheduling result to schedule the time-critical service.

17. The apparatus of claim 1, wherein the first scheduling result from the RCC comprises scheduling information for all UEs in the coverage area of the Cloud-RAN and is generated based on a data traffic information for the respective UEs.

18. The apparatus of claim 1, further comprising a memory circuit configured to store the first scheduling result and the second scheduling result.

19. The apparatus of claim 1, wherein the first scheduling result from the RCC comprises scheduling information for both hybrid automatic repeat request (HARQ) transmission and re-transmission.

* * * * *